US012664189B2

(12) United States Patent
Jeong et al.

(10) Patent No.: US 12,664,189 B2
(45) Date of Patent: Jun. 23, 2026

(54) METHOD FOR ANALYZING TECHNOLOGY AND DEVICE THEREOF

(71) Applicant: SK Innovation Co., Ltd., Seoul (KR)

(72) Inventors: Byeong Ki Jeong, Daejeon (KR); Kyung Min Song, Daejeon (KR); Ky Sang Kwon, Daejeon (KR); Seung Joon Cha, Daejeon (KR); Dong Ha Kim, Daejeon (KR); Hyun Han Kim, Daejeon (KR); Jae Hyeong An, Daejeon (KR); Ui Won Cheong, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 0 days.

(21) Appl. No.: 18/598,378

(22) Filed: Mar. 7, 2024

(65) Prior Publication Data

US 2025/0103629 A1      Mar. 27, 2025

(30) Foreign Application Priority Data

Sep. 27, 2023      (KR) ........................ 10-2023-0130057

(51) Int. Cl.
*G06F 16/3332*      (2025.01)
*G06F 16/3329*      (2025.01)
*G06F 16/35*      (2025.01)

(52) U.S. Cl.
CPC ...... *G06F 16/3334* (2019.01); *G06F 16/3329* (2019.01); *G06F 16/35* (2019.01)

(58) Field of Classification Search
CPC ... G06F 16/3334; G06F 16/3329; G06F 16/35
See application file for complete search history.

(56) References Cited

U.S. PATENT DOCUMENTS

2019/0213407 A1      7/2019  Toivanen et al.
2022/0293107 A1*     9/2022  Leaman .............. G06F 16/2428
(Continued)

FOREIGN PATENT DOCUMENTS

KR      1020170107251 A      9/2017
KR      1020180114588 A      10/2018
KR      1020230033221 A      3/2023

OTHER PUBLICATIONS

Abood et al., "Automated Patent Landscaping. Artificial Intelligence and Law", Artificial Intelligence and Law, 2018, pp. 103-125, vol. 26, No. 2.

(Continued)

*Primary Examiner* — Aleksandr Kerzhner
*Assistant Examiner* — Aryan D Toughiry
(74) *Attorney, Agent, or Firm* — The Webb Law Firm

(57)      ABSTRACT

Provided is a method for analyzing technology including an information collection step of designing a metaframe structure for keywords to be analyzed, deriving a technology structure based on the metaframe structure using a generative AI model, generating search keywords based on the derived technology structure, and searching and obtaining a plurality of documents based on the search keywords; and a technology classification step of refining the plurality of documents according to a similarity between the documents, performing preprocessing to utilize contents of the plurality of documents, and then performing detailed technology classification based on results obtained by performing content-based clustering, and a device for processing the method.

17 Claims, 11 Drawing Sheets

(56) References Cited

U.S. PATENT DOCUMENTS

2023/0401247 A1 * 12/2023 Lehal ................... G06F 40/279
2024/0256582 A1 *  8/2024 Jain .................... G06F 16/3329

OTHER PUBLICATIONS

Joung et al., "Monitoring Emerging Technologies for Technology Planning Using Technical Keyword Based Analysis from Patent Data. Technological Forecasting and Social Change", Technological Forecasting and Social Change, 2017, pp. 281-292, vol. 114.

* cited by examiner

[FIG. 1]
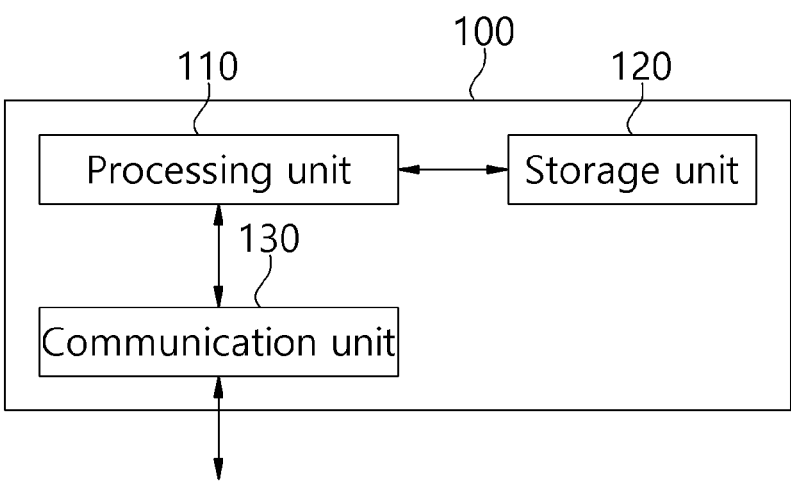

[FIG. 2]
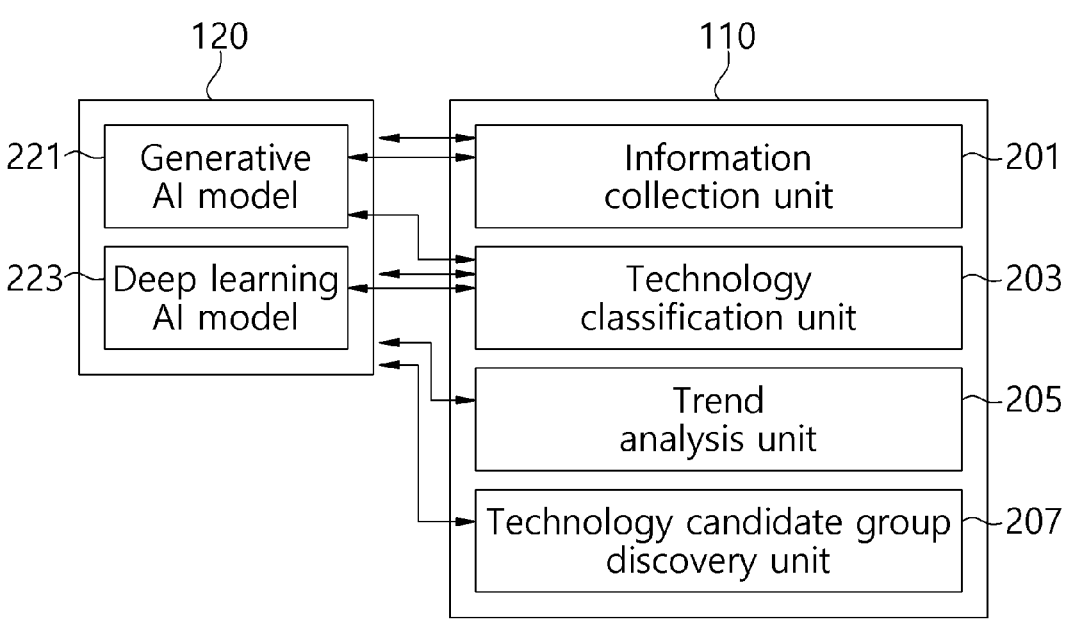

Figure 3:
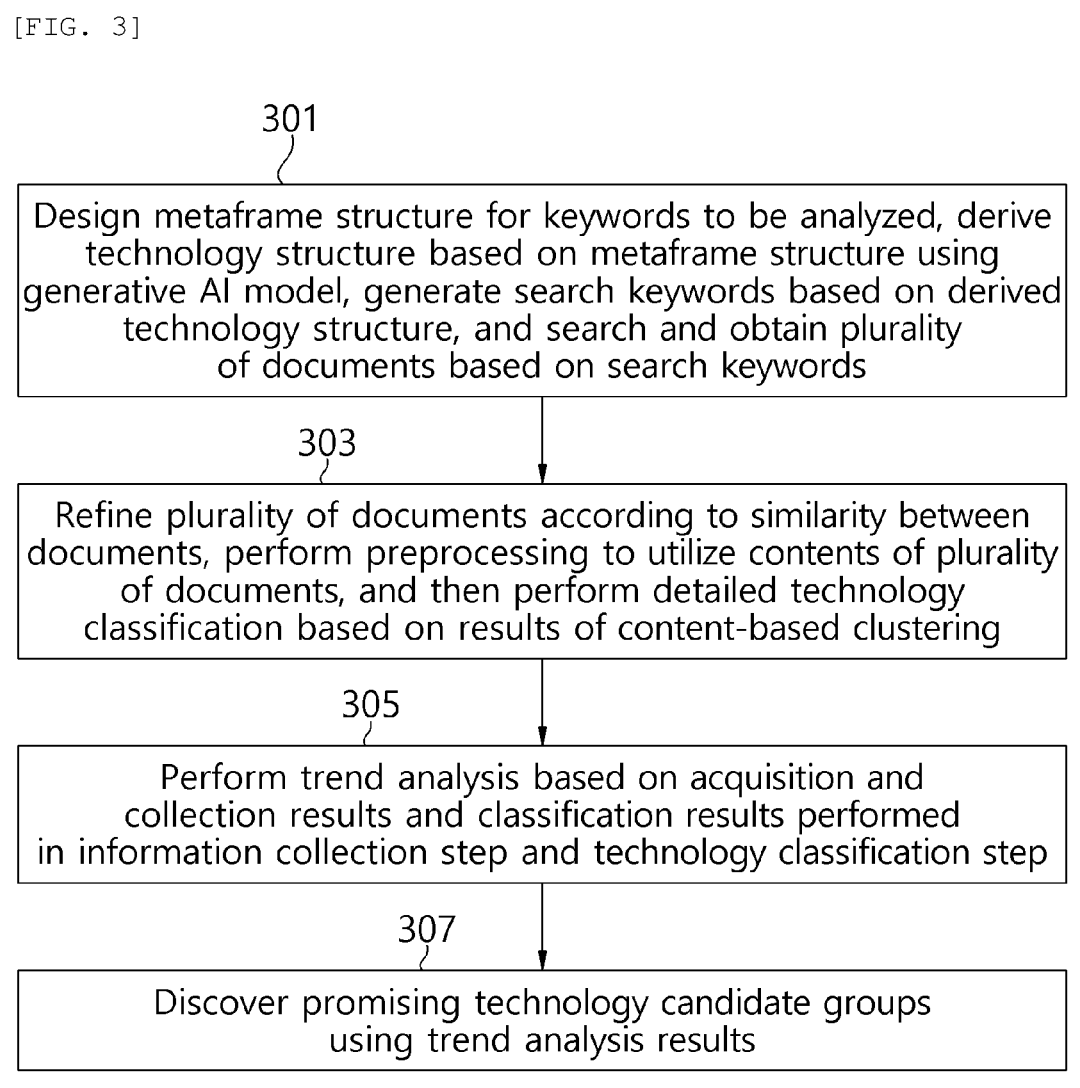

Design metaframe structure for keywords to be analyzed, derive technology structure based on metaframe structure using generative AI model, generate search keywords based on derived technology structure, and search and obtain plurality of documents based on search keywords

303

Refine plurality of documents according to similarity between documents, perform preprocessing to utilize contents of plurality of documents, and then perform detailed technology classification based on results of content-based clustering

305

Perform trend analysis based on acquisition and collection results and classification results performed in information collection step and technology classification step

307

Discover promising technology candidate groups using trend analysis results

[FIG. 4]
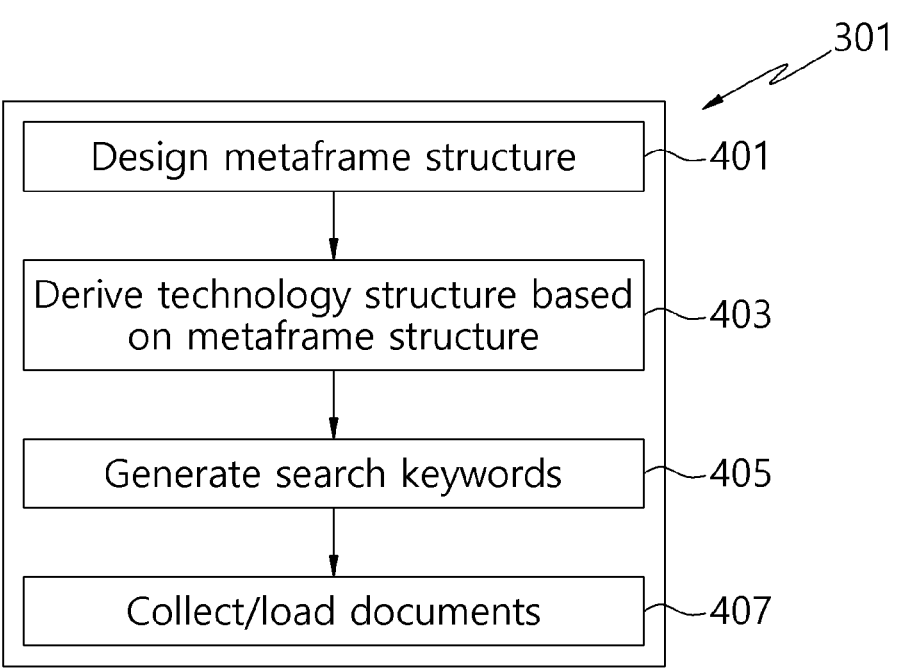

[FIG. 5]
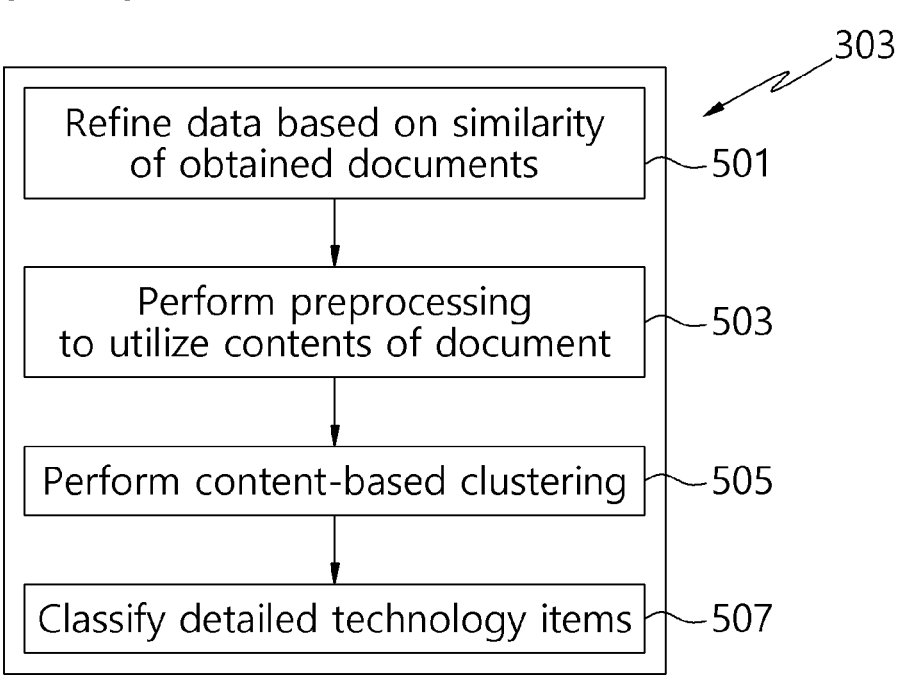
303
Refine data based on similarity
of obtained documents —501
Perform preprocessing
to utilize contents of document —503
Perform content-based clustering —505
Classify detailed technology items —507

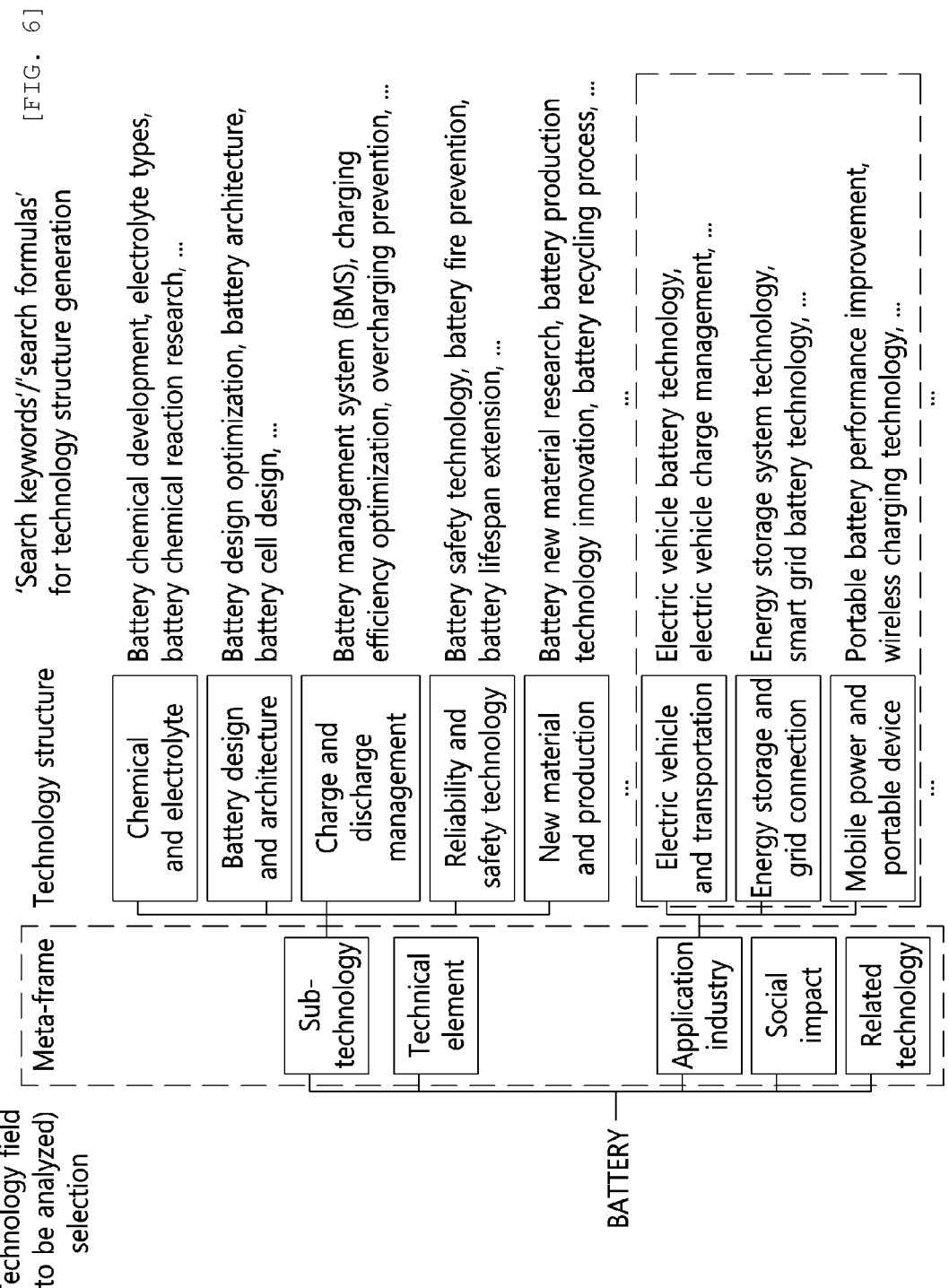
[FIG. 6]

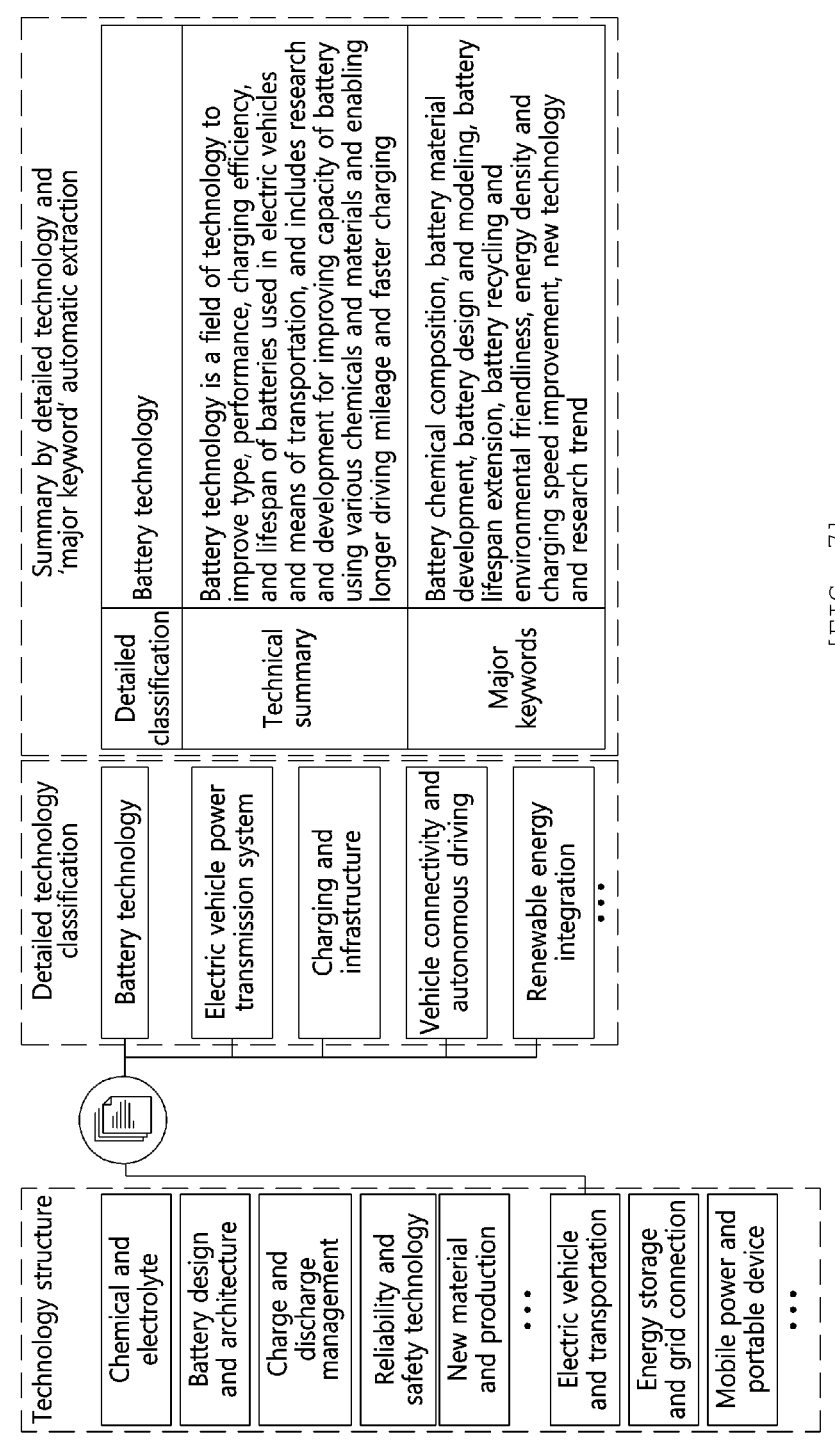
[FIG. 7]

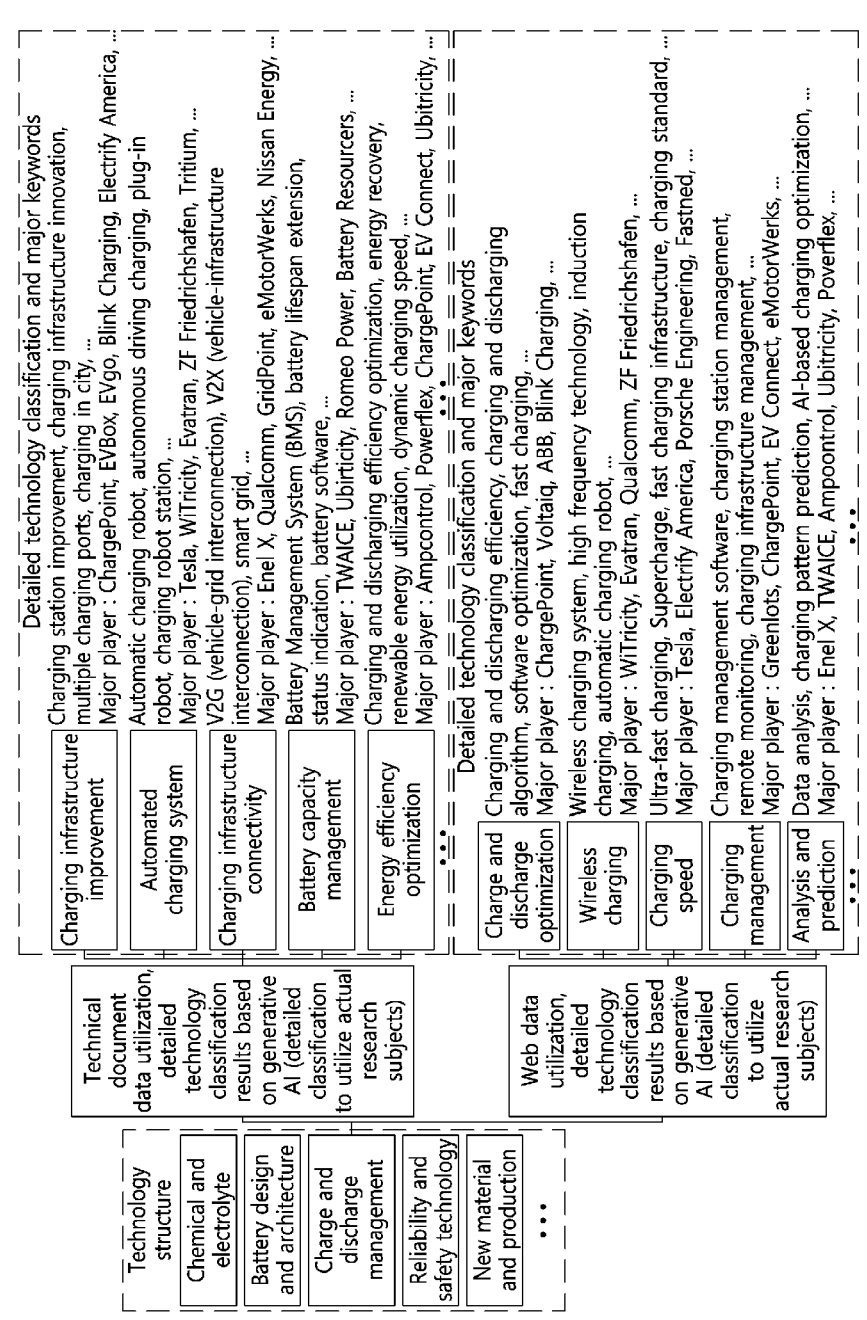
[FIG. 8]

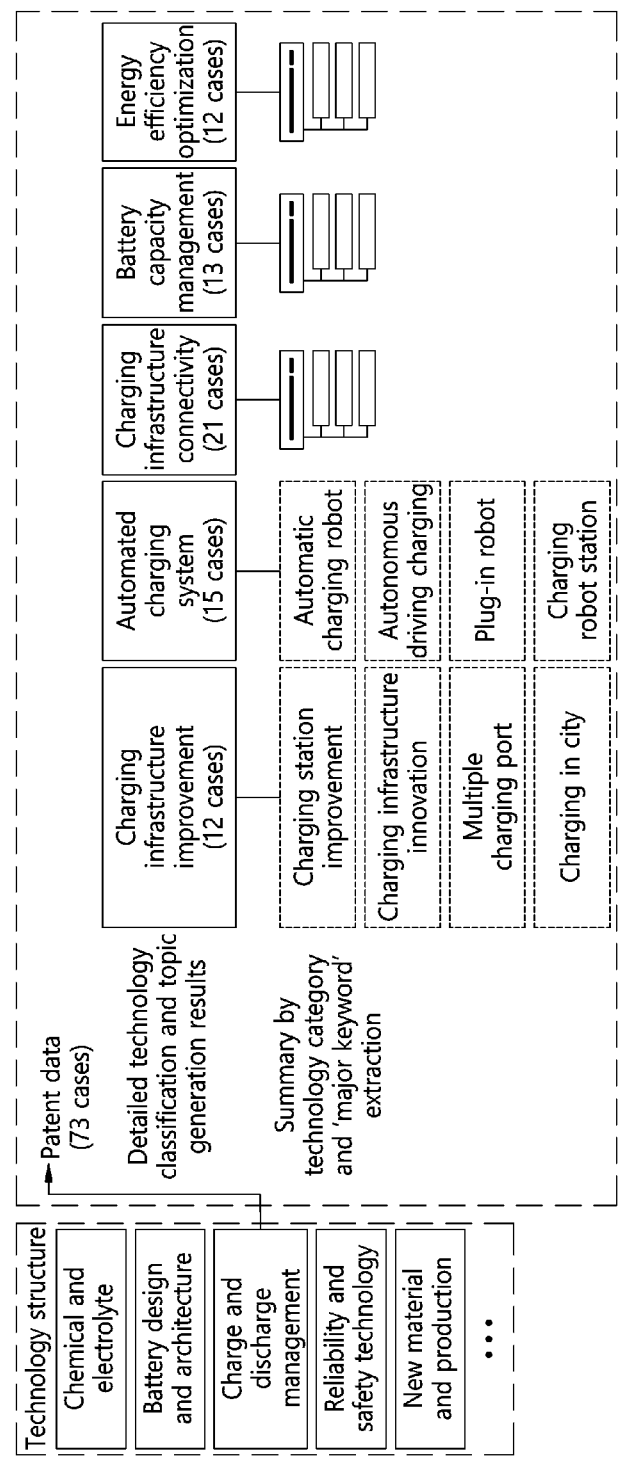
[FIG. 9]

[FIG. 10]
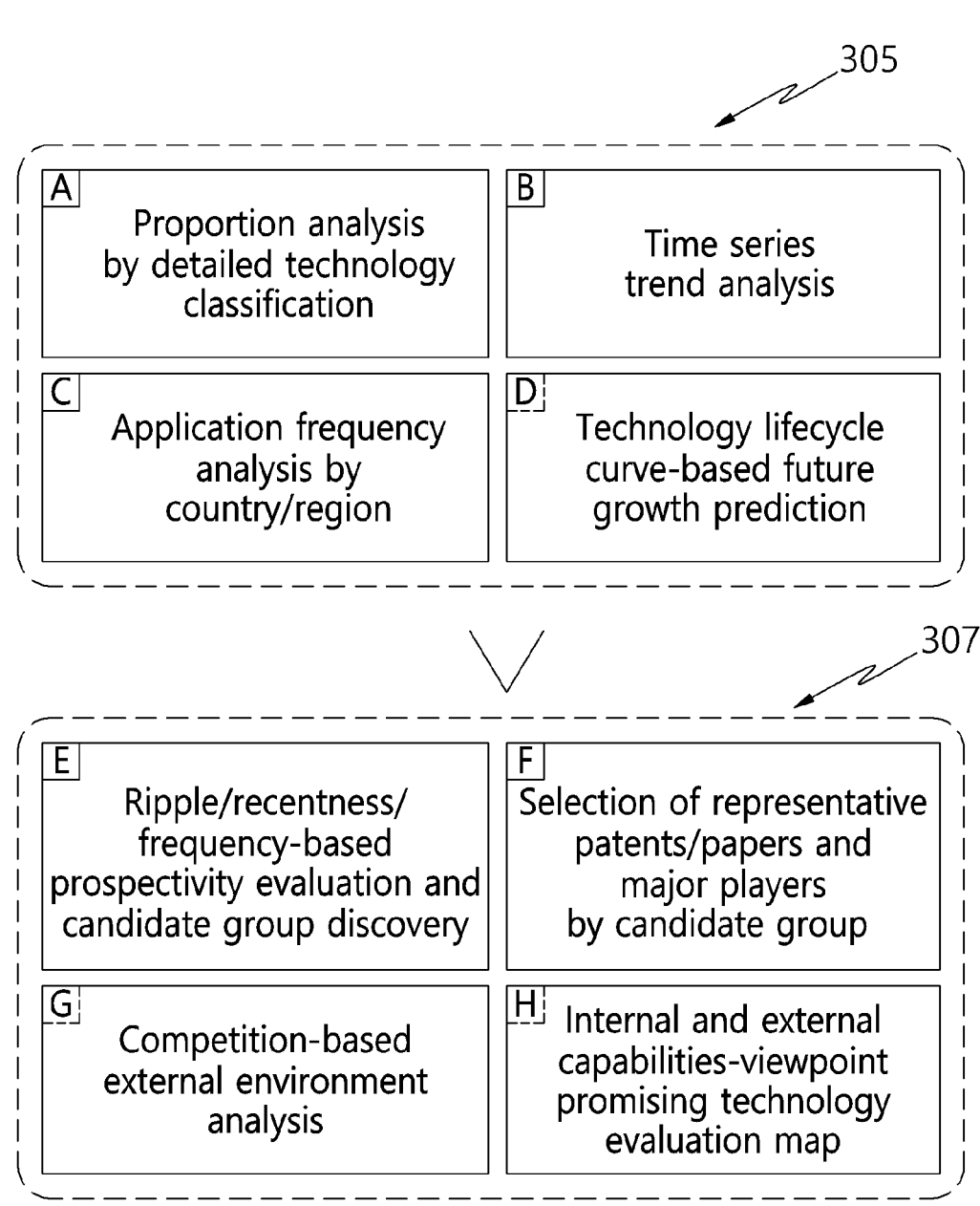

[FIG. 11]

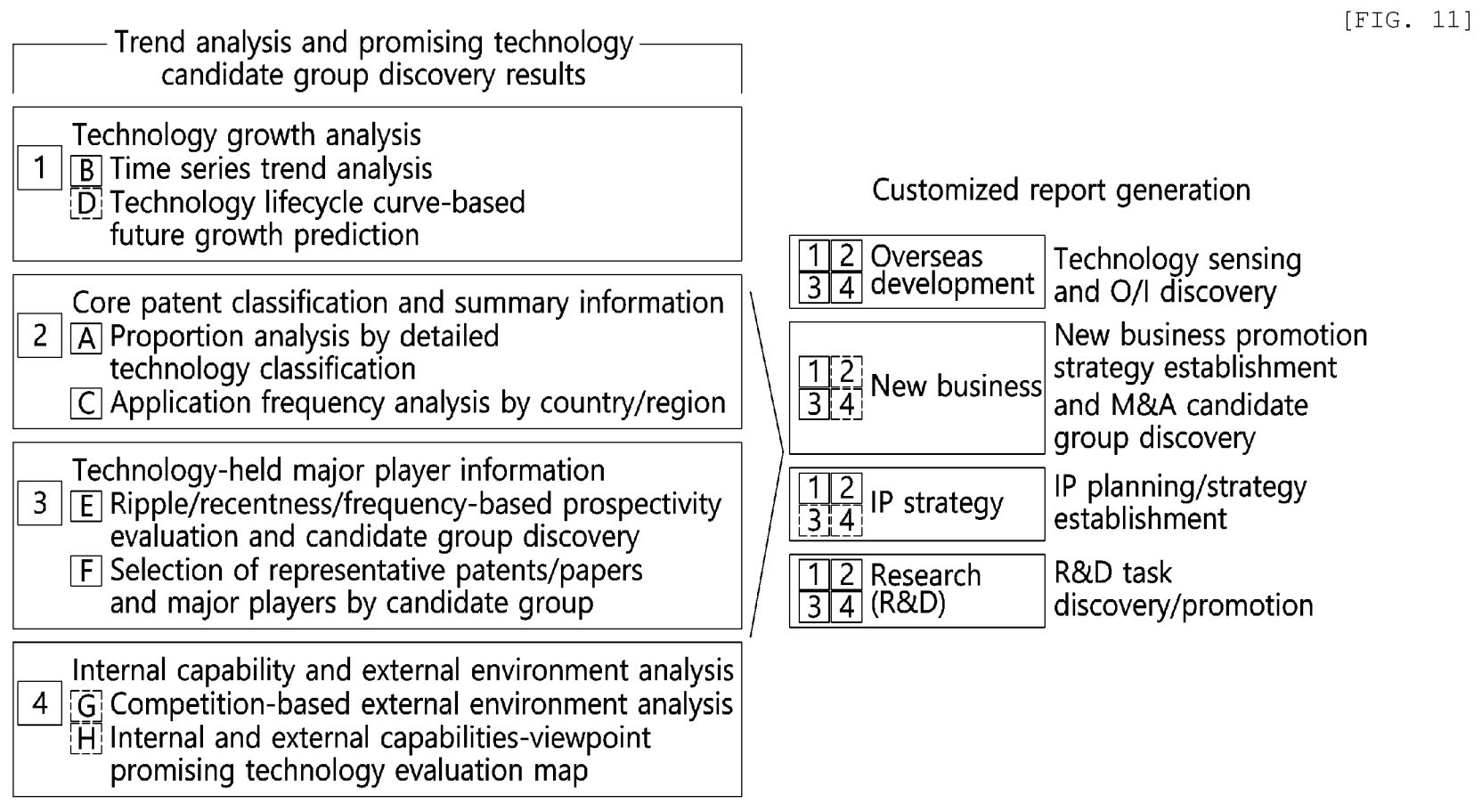

Trend analysis and promising technology candidate group discovery results

1 Technology growth analysis
B Time series trend analysis
D Technology lifecycle curve-based future growth prediction

2 Core patent classification and summary information
A Proportion analysis by detailed technology classification
C Application frequency analysis by country/region

3 Technology-held major player information
E Ripple/recentness/frequency-based prospectivity evaluation and candidate group discovery
F Selection of representative patents/papers and major players by candidate group

4 Internal capability and external environment analysis
G Competition-based external environment analysis
H Internal and external capabilities-viewpoint promising technology evaluation map Customized report generation

1 2 / 3 4 Overseas development — Technology sensing and O/I discovery

1 2 / 3 4 New business — New business promotion strategy establishment and M&A candidate group discovery

1 2 / 3 4 IP strategy — IP planning/strategy establishment

1 2 / 3 4 Research (R&D) — R&D task discovery/promotion

METHOD FOR ANALYZING TECHNOLOGY AND DEVICE THEREOF

CROSS REFERENCE TO RELATED APPLICATION

This application claims priority to Korean Patent Application No. 10-2023-0130057, filed Sep. 27, 2023, the disclosure of which is hereby incorporated by reference in its entirety.

BACKGROUND OF THE INVENTION

1. Field of the Invention

The present invention relates to a method for analyzing technology and a device for processing the method for analyzing technology.

2. Description of Related Art

As social awareness about the importance of intellectual property is increased, the need for even non-experts in intellectual property to search for patents has also been increased. Currently, various patent search services form database are provided for patent search.

However, as technology develops, the technology is subdivided in a variety of ways, and vast amounts of data are accumulated for each of the subdivided technologies. Thereby, manually processing patent data or technical data has a problem of consuming a lot of time and manpower.

In addition, when people refine massive amounts of data, subjective judgments may be involved in the results or mistakes may occur. Thus, in conventional systems there are problems such as decreasing the consistency of the searched data or causing errors, etc.

SUMMARY OF THE INVENTION

According to various embodiments, it is an object of the present invention to provide a method for performing automatic technology classification based on a generative AI model and a device for processing the method.

Problems to be solved through various embodiments are not limited to the above-described problem, and other problems not described above will be clearly understood by those skilled in the art from the following description.

To achieve the above object, according to an aspect of the present invention, there is provided a method for analyzing technology including: an information collection step of designing a metaframe structure for keywords to be analyzed, deriving a technology structure based on the metaframe structure using a generative AI model, generating search keywords based on the derived technology structure, and searching and obtaining a plurality of documents based on the search keywords; a technology classification step of refining the plurality of documents according to a similarity between the documents, performing preprocessing to utilize contents of the plurality of documents, and then performing detailed technology classification based on results obtained by performing content-based clustering; a trend analysis step of performing patent trend analysis based on the acquisition and collection results and the classification results performed in the information collection step and the technology classification step; and a technology candidate group discovery step of discovering promising technology candidate groups using the trend analysis results.

Here, wherein the information collection step may include designing the metaframe structure by including a plurality of metaframe items derived based on a report published from at least one company or at least one organization registered in a technical field corresponding to the keywords to be analyzed.

Here, the plurality of metaframe structures may include at least one metaframe item of sub-technology, technical element, process element, application industry, social impact, and related technology.

Here, the information collection step may include: generating a plurality of technology items related to the keywords to be analyzed in the technical field corresponding to the keywords to be analyzed using the generative AI model; and deriving the technology structure by connecting at least some of the plurality of generated technology items with at least some of the plurality of metaframe items corresponding thereto included in the metaframe structure.

Here, the information collection step may include: generating one or more search keywords corresponding to each of the plurality of technology items included in the technology structure using the generative AI model; and generating one or more search formulas for each of the plurality of technology items using at least some of the one or more search keywords generated for each of the plurality of technology items.

Here, the information collection step may include searching and obtaining documents including a text related to the keywords to be analyzed from a predetermined database or web based on at least some of the search keywords and search formulas.

Here, the technology classification step may include performing the refinement, the preprocessing, and the content-based clustering on one or more documents for each of the plurality of technology items included in the technology structure based on at least one deep learning AI model.

Here, the technology step classification may include: classifying one or more detailed technology items for each of the plurality of technology items based on the content-based clustering results and the generative AI model; and generating technology titles, technology summaries, and major keywords for each of the one or more detailed technology items using one or more clustered documents classified according to the content-based clustering.

Here, the technology classification step may include generating one or more major keywords for each of the one or more detailed technology items from the clustered documents based on at least some of the generative AI and a text mining algorithm.

Here, the technology classification step may include generating at least some of the technology titles and the technology summaries for each of the one or more detailed technology items based on one or more major documents and the major keywords identified for each of the one or more detailed technology items according to the content-based clustering.

Here, the technology classification step may include: determining a cluster center of each of the one or more detailed technology items based on the content-based clustering; and determining the predetermined number of clustered documents located at the cluster center as major documents of the corresponding detailed technology items.

Here, the technology classification step may include: performing the content-based clustering on each of one or more documents previously obtained for each of the plurality of technology items by dividing categories between technical documents including patents or papers, and web data; classifying one or more detailed technology items for each of the categories of the technical document and web data based on the content-based clustering results and the generative AI model; and generating major keywords for each of the one or more detailed technology items using one or more clustered documents classified according to the content-based clustering.

According to another aspect of the present invention, there is provided a device for analyzing technology including: a storage unit in which a generative AI model is stored; an information collection unit configured to design a metaframe structure for keywords to be analyzed, derive a technology structure based on the metaframe structure using a generative AI model, generate search keywords based on the derived technology structure, and search and obtain a plurality of documents based on the search keywords; a technology classification unit configured to refine the plurality of documents according a to similarity between the documents, perform preprocessing to utilize contents of the plurality of documents, and then perform detailed technology classification based on results obtained by performing content-based clustering; a trend analysis unit configured to perform patent trend analysis based on the acquisition and collection results and the classification results performed in the information collection unit and the technology classification unit; and a technology candidate group discovery unit configured to discover promising technology candidate groups using the trend analysis results.

Here, the information collection unit may design the metaframe structure by including a plurality of metaframe items derived based on a report published from at least one company or at least one organization registered in a technical field corresponding to the keywords to be analyzed.

Here, the plurality of metaframe structures may include at least one metaframe item of sub-technology, technical element, process element, application industry, social impact, and related technology.

Here, the information collection unit may generate a plurality of technology items related to the keywords to be analyzed in the technical field corresponding to the keywords to be analyzed using the generative AI model, and derive the technology structure by connecting at least some of the plurality of generated technology items with at least some of the plurality of metaframe items corresponding thereto included in the metaframe structure.

Here, the information collection unit may generate one or more search keywords corresponding to each of the plurality of technology items included in the technology structure using the generative AI model, and generate one or more search formulas for each of the plurality of technology items using at least some of the one or more search keywords generated for each of the plurality of technology items.

Here, the information collection unit may search and obtain documents including a text related to the keywords to be analyzed from a predetermined database or web based on at least some of the search keywords and search formulas.

Here, the technology classification unit may perform the refinement, the preprocessing, and the content-based clustering on one or more documents for each of the plurality of technology items included in the technology structure based on at least one deep learning AI model.

Here, the technology classification unit may classify one or more detailed technology items for each of the plurality of technology items based on the content-based clustering results and the generative AI model, and generate technology titles, technology summaries, and major keywords for each of the one or more detailed technology items using one or more clustered documents classified according to the content-based clustering.

Here, the technology classification unit may generate one or more major keywords for each of the one or more detailed technology items from the clustered documents based on at least some of the generative AI and a text mining algorithm.

Here, the technology classification unit may generate at least some of the technology titles and the technology summaries for each of the one or more detailed technology items based on one or more major documents and the major keywords identified for each of the one or more detailed technology items according to the content-based clustering. Here, the technology classification unit may determine a cluster center of each of the one or more detailed technology items based on the content-based clustering, and determine the predetermined number of clustered documents located at the cluster center as major documents of the corresponding detailed technology items.

Here, the technology classification unit may perform the content-based clustering on each of one or more documents previously obtained for each of the plurality of technology items by dividing categories between technical documents including patents or papers, and web data, classify one or more detailed technology items for each of the categories of the technical document and web data based on the content-based clustering results and the generative AI model, and generate major keywords for each of the one or more detailed technology items using one or more clustered documents classified according to the content-based clustering.

According to various embodiments, it is possible to reduce the time required for technology analysis while expanding the scope of technology analysis in a variety of fields through the method and device for analyzing technology.

According to various embodiments, costs and time required for basic technology analysis based on raw data may be saved through the method and device for analyzing technology, thereby it is possible to improve work efficiency by allowing data experts to focus on analysis of advanced information.

According to various embodiments, by providing the method and device for analyzing technology based on the generative AI model, it is possible to discover analysis indicators and method which reflect multifaceted aspects of technology.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a conceptual block diagram schematically illustrating the configuration f a device according to an embodiment;

FIG. 2 is a block diagram schematically illustrating the detailed configuration of a processing unit and a storage unit in the device according to an embodiment;

FIG. 3 is a flowchart illustrating the flow of operations of performing technology analysis based on an AI model in the device according to an embodiment;

FIG. 4 is a block diagram illustrating the flow of operations of collecting information in the device according to an embodiment;

FIG. 5 is a block diagram illustrating the flow of operations of performing technology classification in the device according to an embodiment;

FIG. 6 is a diagram illustrating operations of generating search keywords in the device according to an embodiment;

FIG. 7 is a diagram illustrating operations of classifying detailed technologies in the device according to an embodiment;

FIG. 8 is a diagram exemplarily illustrating operations of classifying detailed technologies based on technical documents in the device according to an embodiment;

FIG. 9 is a diagram illustrating operations of classifying detailed technologies by dividing between technical document data and web data in the device according to an embodiment;

FIG. 10 is a diagram illustrating operations of performing trend analysis and discovering promising technology candidate groups in the device according to an embodiment; and FIG. 11 is a diagram illustrating results of discovering the promising technology candidate groups and operations of generating customized reports in the device according to an embodiment.

DESCRIPTION OF THE INVENTION

Hereinafter, embodiments will be described in detail with reference to the accompanying drawings. However, since various changes can be made in the embodiments, the scope of the patent invention is not limited or restricted by these embodiments. It should be understood that all modifications, equivalents, and alternatives for the embodiments are included in the scope of the present invention.

The terms used in the embodiments are used only for the purpose of describing the invention, and should not be interpreted as limiting. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or combinations thereof.

Unless otherwise defined, all terms including technical or scientific terms used herein have the same meaning as commonly understood by one of ordinary skill in the art to which the present invention pertains. It will be further understood that terms, such as those defined in commonly used dictionaries, should be interpreted as having a meaning that is consistent with their meaning in the context of the corresponding art and will not be interpreted in an idealized or overly formal sense unless expressly so defined herein.

Further, in describing the embodiments with reference to the accompanying drawings, the same reference numerals are denoted to the same components regardless of the number of the drawings, and the same configuration will not be repeatedly described. Further, in description of the embodiments, the publicly known techniques related to the present invention, which are verified to be able to make the purport of the present invention unnecessarily obscure, will not be described in detail.

In addition, in describing components of the embodiment, the terms such as first, second, A, B, (a), (b), and the like may be used. These terms are intended to distinguish the components from other components, and do not limit the nature, sequence or order of the corresponding components.

It will be understood that when a component is described to as being "connected," "combined" or "coupled" to another component, the component may be directly connected or coupled the another component, but it may be "connected," "combined" or "coupled" to the another component intervening another component may be present.

In addition, it will be understood that when a component is described as being "connected" or "combined" by communication to another component, that component may be connected or combined by wireless or wired communication to the another component, but it may be "connected" or "combined" to the another component intervening another component may be present.

Further, in describing the components of the embodiment, the meaning of "or" may mean each of the components, may mean two or more of the components, or may mean all of the components. For example, it should be understood that the expressions "a, b or c" represent any one of "a," "b," "c," "a and b," "a and c," "b and c," and "a, b and c."

Components included in one embodiment and components including common functions will be described using the same names in other embodiments. The description given in one embodiment may be applied to other embodiments, and therefore will not be described in detail within the overlapping range, unless there is a description opposite thereto.

The device and/or 'data' processed by the device may be expressed in terms of 'information'. Here, the information may be used as a concept including the data.

The present disclosure may provide a method for performing technology analysis based on an artificial intelligence (AI) model and a device for processing the method. To describe in more detail, the present disclosure may provide a method for performing technology analysis on keywords to be analyzed, which includes: searching and obtaining documents based on a meta-frame structure; classifying the obtained documents based on the similarity between the documents and clustering; and performing trend analysis and discovering promising technology candidate groups based on the obtained documents and document classification results, and a device for processing the method.

Hereinafter, various embodiments of the present disclosure will be described with reference to the accompanying drawings. However, the drawings attached to the present specification serve to further understand the technical idea together with the detailed description, such that the present disclosure should not be construed s being limited only to the illustrations of the drawings.

FIG. 1 is a conceptual block diagram schematically illustrating the configuration of a device according to an embodiment, and FIG. 2 is a block diagram schematically illustrating the detailed configuration of a processing unit and a storage unit in the device according to an embodiment.

Referring to FIG. 1, a device 100 for performing technology analysis may include a processing unit 110, a storage unit 120, and a communication unit 130. To describe in more detail, as shown in FIG. 2, the processing unit 110 may include at least one of an information collection unit 201, a technology classification unit 203, a trend analysis unit 205, and a technology candidate group discovery unit 207.

The processing unit 110 includes at least one processor (or controller), and may process at least one control command for the device 100 according to various embodiments or components connected to the device 100 through at least one program (app, application, tool, plug-in, software, and the like).

In this case, at least one of the information collection unit 201, the technology classification unit 203, the trend analysis unit 205, and the technology candidate group discovery unit 207 may be configured through one processor, or may be configured by an independent or separate processor, respectively.

In this case, at least one program may be stored in the storage unit 120 of the device 100 and/or a storage unit of a device connected to the device 100.

According to various embodiments, the at least one program includes at least some of a generative AI model and a deep learning AI model, and may be configured to perform technology analysis.

Hereinafter, in various embodiments, it may be understood that performing an operation according to the control commands by the device 100 indicates performing a predetermined operation through at least one program related to processing of at least one control command of the device 100.

Here, it will be described that the control command processing is performed through the at least one program installed in the device 100, but it is not limited thereto, and may be performed through another program or a temporary installation program previously provided and installed in the storage unit 120.

According to an embodiment, the control command processing may be performed through at least a portion of a database provided free of charge or for a fee in an external device connected to the device 100.

The operation of the device 100 is performed based on data processing and device control of the processing unit 110, and the processing unit 110 may also perform predetermined functions on the basis of the control commands received through an input/output unit (not shown) and/or the communication unit of the device 100.

In addition, in processing data obtained through the communication unit 130, the processing unit 110 may process the data based on an identified user. For example, the processing unit 110 may identify a user based on user information received from at least one other device (e.g., a user device) connected thereto through the communication unit 130 and/or user information obtained through an input unit (or input/output unit) connected to the device 100, and perform an operation according to the control command input by the identified user.

The storage unit 120 may store various data processed by at least component (e.g., the processing unit 110 or the communication unit 130) of the device 100. The data may include, for example, a program for control command processing or data processed through the program, and/or input data and output data related thereto.

The storage unit 120 may include artificial intelligence algorithms including an artificial neural network algorithm for processing control commands, a deep learning algorithm, and a regression analysis algorithm, as well as at least some of mechanisms, operators, language models, and big data related thereto. In addition, the storage unit 120 may include at least one deep learning model (or machine learning model) constructed based on at least some of the above-described artificial intelligence algorithms.

For example, a generative AI model 221 or a deep learning AI model 223 may include at least some of a classification model, a detection model, and a generation model. Here, the classification model may include at least some of various algorithms based on transformer neural such networks as Bidirectional Encoder Representations from Transformers (BERT), A Lite BERT ALBERT), Generative Pre-trained Transformer (GPT), etc., and Convolutional Neural Network (CNN).

The detection model may include at least some of various algorithms based on you only look once (YOLO), Regions with Convolutional Neural Networks (R-CNN), and transformer neural networks.

In addition, the generation model may include at least some of various algorithms based on Generative Adversarial Networks (GAN), Variational Autoencoders (VAE), or transformer neural networks.

The storage unit 120 includes the generative AI model 221 as shown in FIG. 2, and may further include the deep learning AI model 223.

To describe in more detail, the generative AI model 221 may include at least one of generative AI models 221 among a generative AI model 221 for deriving technology structures related to keywords to be analyzed based on the metaframe structure, a generative AI model 221 configured to generate search keywords for document search based on the derived technology structures, and a generative AI model 221 configured to classify detailed technology structures of the technology structures on the basis of content-based clustering results.

In addition, the deep learning AI model 223 may include at least one of deep learning AI models 223 among a deep learning AI model 223 configured to refine documents based on the similarity between the documents, a deep learning AI model 223 configured to perform preprocessing for utilization or clustering of the document contents, and a deep learning AI model 223 configured to perform clustering of the documents.

The storage unit 120 may include data for confirming and processing the predetermined control and operations through signals received from each of devices included in the input/output unit (not shown) and/or through the communication unit 130.

The operations described through the storage unit 120 are processed by the processing unit 110, and data for processing the related operations, data in process, processed data, preset data, and the like may be stored in the storage unit 120 as a database.

The data stored in the storage unit 120 may be changed, modified, deleted, and/or generated as new data by the processing unit 110 based on user input of the identified user.

The storage unit 120 may store device setting information of the device 100. The device setting information may be setting information on the device 100 and at least some of functions and services provided by the device 100.

The storage unit 120 may store user information (or user account) for at least one user. As the user information, at least some piece of information among user identification information (e.g., identification, ID), password, and user-customized setting information may be stored. The user-customized setting information is setting information on at least some of control authority and/or the functions of the device 100, and may be set and stored according to the administrator input.

The storage unit 120 may include a volatile memory, a non-volatile memory, and/or a computer-readable recording medium as known in the art. In this case, the computer-readable recording medium may store a computer program for performing an operation to determine an abnormality in circuits of the battery by the device 100 based on various embodiments.

The communication unit 130 may support establishment of a wired communication channel or establishment of a wireless communication channel between the device 100 and at least one other device (e.g., the user device or a server), and performing communication through the established communication channel.

The communication unit 130 may perform operations such as modulation/demodulation and encryption/decryption, etc. during performing communication. The communication unit 130 may be operated dependently on or independently from the processing unit 110, and may include one or more communication processors which support wireless communication and/or wired communication.

According to an embodiment, when supporting the wireless communication, the communication unit 130 may include at least some communication modules of wireless communication modules, for example, a cellular communication module, a near field communication module, and a global navigation satellite system (GNSS) communication module.

When supporting the wired communication, the communication unit 130 may include at least some communication modules of wired communication modules, for example, a local area network (LAN) communication module, a power line communication module, a controller area network (CAN) communication module, or serial peripheral interface (SPI).

To describe in more detail, the communication unit 130 may communicate with the external device by wired and/or wirelessly through near field communication networks such as Bluetooth, Bluetooth Low Energy (BLE), WiFi, WiFi direct, Infrared Data Association (IrDA), ZigBee, UWB, and radio frequency (RF), and/or far field communication networks such as a cellular network, the Internet or a computer network (e.g., LAN or WAN).

Various types of communication modules constituting the communication unit 130 may be integrated into one component (e.g., a single chip), or may be implemented as a plurality of separate components (e.g., a plurality of chips).

Referring to FIG. 1, it is shown that the communication unit 130 performs communication with an external device of the device 100, but it is not limited thereto, and for example, may perform communication with the storage unit 120, and/or at least some of the various components of device 100 which are not illustrated and configured in FIG. 1.

Although not shown in FIG. 1, the device 100 may include at least one input/output unit or may be connected to at least one input/output unit.

For example, the input/output unit may include at least one display unit (e.g., display) for outputting information related to the operations of the technology analysis program. In this case, the display unit may be configured as a touch screen capable of touch input.

In addition, the input/output unit may include at least some of an input unit (not shown) configured to input data, such as a microphone, keyboard, mouse, or the like, and an output unit (not shown) configured to output data, such as a speaker, driving unit or the like.

According to various embodiments, the device 100 or the user device may include at least some of functions of all information and communication devices including a mobile communication terminal, a multimedia terminal, a wired terminal, a fixed terminal, an internet protocol (IP) terminal and the like.

The device 100 is a device for control command processing, and may include at least some functions of a workstation or a large-capacity database, or may be connected thereto through communication.

As the user device connected to the device 100, a mobile phone, a personal computer (PC), a portable multimedia player (PMP), a mobile internet device (MID), a smartphone, a tablet PC, a phablet PC, a laptop computer, and the like may be exemplified.

According to various embodiments, the user device will be described as a device which is connected to the device 100 and communicates therewith. For example, although not illustrated throughout the drawings, the user device may be a smartphone of the user which is connected to the device 100 through wireless communication.

The user device may be connected to the device 100 through at least one program installed therein, or may be connected to the device 100 through at least one web page accessed on online by the device 100. To this end, the device 100 may include at least some of the functions of a server and/or a terminal for providing a charging control service.

The server is one entity that exists on a network, and performs roles of a web server, a database server, and an application server. According to a preferred embodiment, the server may provide various services to the device 100 and/or the user device based on processing of the device 100.

Operations of performing technology analysis carried out by the above-described device 100 will be described in more detail with reference to FIG. 3 and various attached drawings.

To this end, FIG. 3 is a flowchart illustrating the flow of operations of performing technology analysis based on an AI model in the device according to an embodiment. FIG. 4 is a block diagram illustrating the flow of operations of collecting information in the device according to an embodiment. FIG. 5 is a block diagram illustrating the flow of operations of performing technology classification in the device according to an embodiment. FIG. 6 is a diagram illustrating operations of generating search keywords in the device according to an embodiment. FIG. 7 is a diagram illustrating operations of classifying detailed technologies in the device according to an embodiment. FIG. 8 is a diagram exemplarily illustrating operations of classifying detailed technologies based on technical documents in the device according to an embodiment. FIG. 9 is a diagram illustrating operations of classifying detailed technologies by dividing between technical document data and web data in the device according to an embodiment. FIG. 10 is a diagram illustrating operations of performing trend analysis and discovering promising technology candidate groups in the device according to an embodiment. And, FIG. 11 is a diagram illustrating results of discovering the promising technology candidate groups and operations of generating customized reports in the device according to an embodiment.

First, referring to FIGS. 2 and 3, the information collection unit 201 may design (or generate) a metaframe structure for keywords to be analyzed, derive a technology structure based on the metaframe structure using the generative AI model 221, generate search keywords based on the derived technology structure, and search and obtain (301) a plurality of documents based on the search keywords.

To describe in more detail with reference to FIG. 4, the information collection unit 201 may obtain keywords to be analyzed for performing technology analysis through user input or the communication unit 130. Here, the keywords to be analyzed may include words for a specific technical field.

In addition, the information collection unit 201 may extract words for the specific technical field from phrases or sentences obtained through the user input or the communication unit 130, and determine the extracted words as the keywords to be analyzed. To this end, the setting information of the device 100 may include the specific technical field for technology analysis set in advance therein.

The information collection unit 201 may design 401 a metaframe structure based on the obtained keywords to be analyzed or the preset technical field. To describe in more detail, the information collection unit 201 may design a metaframe structure by outputting at least one metaframe item set in advance for at least one of the keywords to be analyzed and the preset technical field.

In addition, the information collection unit 201 may design the metaframe structure by including a plurality of metaframe items derived based on a report published from at least one company or at least one organization registered in a technical field corresponding to the keywords to be analyzed.

To describe in more detail, the information collection unit 201 may derive at least one metaframe item based on a table of contents, topic, title, heading of a report, or words included therein, which are published from the company or organization.

Here, the company may include at least one of a company seeking to perform technology analysis, a company conducting business in the technical field, and a competing company.

In addition, the organization may include at least one of various organizations that conduct the business related to the technology, such as the Korean Intellectual Property Office, the Korean Intellectual Property High Court, the Korea Institute of Intellectual Property, the Korea Institute of Patent Information, and the Korea Intellectual Property Strategy Agency.

According to one embodiment, as shown in FIG. 6, the metaframe structure may include at least one metaframe item of sub-technology, technical element, process element, application industry, social impact, and related technology.

The information collection unit 201 may derive (403) a technology structure for technology analysis based on the metaframe structure. To describe in more detail, the information collection unit 201 may generate a plurality of technology items related to the keywords to be analyzed in the technical field corresponding to the keywords to be analyzed using the generative AI model 221.

The information collection unit 201 may derive a technology structure by connecting at least some of the plurality of generated technology items with at least some of the plurality of metaframe items corresponding thereto included in the metaframe structure. In this case, the information collection unit 201 may derive the technology structure based on the generative AI model 221.

For example, an example in which a "Battery" was selected as the keyword to be analyzed will be described with reference to FIG. 6 as follows.

Referring to FIG. 6, the information collection unit 201 may process at least some elements among the 'Battery', which is a keyword input as the keyword to be analyzed, and a 'Sub-technology', 'Technical element', 'Process element', 'Application industry', 'Social impact', and 'Related technology', which are elements stored or newly input as the metaframe items, as input values to the generative AI model 221, thus to derive at least one technology item for at least one metaframe item.

To describe this process with reference to 6, for example, the information collection unit 201 may apply the 'Sub-technology' metaframe item for the keyword to be analyzed 'Battery' to the generative AI model 221, thus to derive a technology structure including technology items of 'Chemical and electrolyte', 'Battery design and architecture', 'Charge and discharge management', 'Reliability and safety technology', and 'New material and production'.

In addition, the information collection unit 201 may derive the technology structure by including at least some of technology items of 'Electric vehicle and transportation', 'Energy storage and grid connection', and 'Mobile power and portable device' for the 'Application industry' metaframe item.

In addition, referring to FIG. 6, it shows that the technology structure is derived for the metaframe items of the 'Sub-technology' and 'Application industry', but the information collection unit 201 may derive technology structures including other metaframe items, for example, at least one technology item for the at least one metaframe item among the 'Technical element', 'Process element', 'Social impact', and 'Related technology'.

Again, returning to FIG. 4, the information collection unit 201 may generate (405) search keywords based on the derived technology structure. In this case, the information collection unit 201 may generate the search keywords based on the generative AI model 221.

The information collection unit 201 may generate one or more search keywords corresponding to each of the plurality of technology items included in the technology structure using the generative AI model 221.

For example, referring to FIG. 6, it can be confirmed that, by the information collection unit 201, the 'Chemical and electrolyte', 'Battery design and architecture', 'Charge and discharge management', 'Reliability and safety technology', and 'New material and production', 'Electric vehicle and transportation', 'Energy storage and grid connection', and 'Mobile power and portable device', which are derived based on the generative AI model 221 as the technology items, were processed as input values to the generative AI model 221 for deriving keywords, thus to generate one or more search keywords (or search words) for each of the technology items.

Referring to FIG. 6, it can be confirmed that, by the information collection unit 201, a 'Battery chemical development', 'Electrolyte Type', and 'Battery chemical reaction research' were generated as search keywords for the technology item of the 'Chemical and electrolyte'.

In addition, it can be confirmed that, by the information collection unit 201, an 'Electric vehicle battery technology', 'Electric vehicle charge management', etc. were generated as search keywords for the technology item of the 'Electric vehicle and transportation'.

In addition, as shown in FIG. 6, it can be confirmed that, by the information collection unit 201, search keywords related to other technology items, for example, the corresponding technology items for at least one technology item among the 'Battery design and architecture', 'Charge and discharge management', 'Reliability and safety technology', 'New material and production', 'Energy storage and grid connection', and 'Mobile power and portable device' were generated.

Further, the information collection unit 201 may generate one or more search formulas for each of the plurality of technology items using at least some of the one or more search keywords generated for each of the plurality of technology items included in the technology structure.

In this case, the information collection unit 201 may generate one or more search formulas for searching for documents from at least some of a preset database, a web page (or web), or a search engine.

Here, the search engine may include a patent search engine, for example, at least one of various search engines such as Korea Intellectual Property Rights Information Service (KIPRIS), Worldwide Intellectual Property System online (WIPS On), Google Patents, and USPTO Patent Full-Text and Image Database (USPTO PatFT) and Espacenet.

Again, returning to FIG. 4, the information collection unit 201 may search and obtain (or collect and load) (407) related documents based on at least some of the generated search keywords and search formulas.

In this case, the information collection unit 201 may search and obtain documents including a text related to the keywords to be analyzed from a predetermined database, search engine, or web based on at least some of the search keywords and search formulas. In addition, the information collection unit 201 may search and obtain at least one document including the text related to keywords to be analyzed for each of the plurality of technology items.

Further, the information collection unit 201 may search and obtain documents related to at least some of the keywords to be analyzed and the technology items included in the technology structure, as well as the search keywords and search formulas. In this case, the information collection unit 201 may search and obtain the documents based on the generative AI model 221 and the deep learning AI model 223.

Thereafter, referring to FIGS. 2 and 3, the technology classification unit 203 may refine the plurality of documents according to a similarity the between documents, perform preprocessing to utilize contents of the plurality of documents, and then perform (303) detailed technology classification based on results obtained by performing content-based clustering.

To describe in more detail with reference to FIG. 5, the technology classification unit 203 may refine (501) data based on the similarity between the obtained documents. In this case, the technology classification unit 203 may perform data refinement based on the deep learning AI model 223.

The technology classification unit 203 may perform at least some of vectorization and similarity measurement operations on the obtained documents in order to perform data refinement.

To describe in more detail, the technology classification unit 203 may extract a text from the obtained documents and perform vectorization on the extracted text. For example, the technology classification unit 203 may convert the text extracted from the documents into a vector form.

To describe in more detail, the technology classification unit 203 may vectorizes the document by representing words as a dense vector based on word embedding techniques (e.g., Word2Vec, GloVe), or representing the entire document as a vector based on document embedding techniques (e.g., TF-IDF, document embedding).

The technology classification unit 203 may measure the similarity between the documents using the vectorized document. For example, the technology classification unit 203 may measure a distance between the vectors based on at least some of various similarity measurement techniques such as Cosine Similarity, Jaccard Similarity, Euclidean Distance, Manhattan Distance, Edit Distance, Term Frequency-Inverse Document Frequency (TF-IDF) and the like.

The technology classification unit may refine (or improve) the quality of documents by removing at least one piece of information determined to be unnecessary based on the similarity of the documents measured based on the distance between the document vectors measured, grouping duplicate words for consistency or accuracy of data, or correcting typos, etc.

The technology classification unit 203 may perform (503) preprocessing to utilize contents of the documents or perform clustering on the refined documents.

For example, the technology classification unit 203 may perform at least some of various preprocessing operations on the text extracted from the documents, such as removing special characters, converting uppercase letters to lowercase in English, tokenization, headword extraction, morphological analysis, or removing stop words, etc.

In this case, the technology classification unit 203 may divide the documents according to the types thereof. For example, the technology classification unit 203 may divide the documents into technical document data and web data.

Here, the technical document may include patent documents, standard documents, or papers. In addition, the technical document may further include at least one document selected from the group consisting of examination regulations, reports, design documents, manuals, and educational data.

For the documents divided as the technical document, the technology classification unit 203 may divide the documents by including at least one document category among various document categories such as the patent documents, standard documents, papers, examination regulations, reports, design documents, manuals, and educational data.

In this case, the technology classification unit 203 may divide the documents according to the categories thereof based on various characteristics such as metadata of the documents, whether a preset specific word is included to divide the document categories, document structure and the like.

Thereafter, the technology classification unit 203 may measure the similarity of the documents based on the distance between the document vectors, and if the similarity among the documents included in the same technology item is greater than a predetermined value, determine them as the same document, and remove at least one document as a duplicate document.

In addition, the technology classification unit 203 may determine the similarity with the technology item and the generated search keyword for the corresponding technology items among the documents included in the technology item, and, if the similarity is less than the predetermined value, determine them as documents having a low degree of relevance with the corresponding technology item or the search keyword, and remove at least one document as an irrelevant document.

In addition, the technology classification unit 203 may perform at least some of various preprocessing operations, such as removing URLs included in the document or replacing specific words or patterns.

Then, the technology classification unit 203 may perform (505) clustering on the documents based on the vectorized and preprocessed documents. In this case, the technology classification unit 203 may perform content-based clustering on the documents.

To describe in more detail, the technology classification unit 203 may group the documents by applying a clustering algorithm. For example, the technology classification unit 203 may group the documents by applying at least some of various clustering algorithms such as k-means, hierarchical clustering, Density-Based Spatial Clustering of Applications with Noise (DBSCAN) and the like.

The technology classification unit 203 may measure the similarity of the documents based on the distance between the vectorized documents or the distance between the vectorized texts.

Here, the technology classification unit 203 may perform (505) clustering of the documents on each of the plurality of technology items included in the technology structure. In this case, the technology classification unit 203 may perform operations of data refinement (501), preprocessing (503), and clustering (505) on the documents based on at least one deep learning AI model 223.

Here, the technology classification unit 203 may perform content-based clustering on each of one or more documents previously obtained for each of the plurality of technology items by dividing at least some of the categories between technical documents including patents, papers, etc., and web data.

The technology classification unit 203 may generate (507) one or more detailed technology items for each of the plurality of technology items based on the content-based clustering results and the generative AI model 221.

For example, referring to FIG. 7, it can be confirmed that, by the technology classification unit 203, technology items such as a 'Battery technology', 'Electric vehicle power transmission system', 'Charging and infrastructure', 'Vehicle connectivity and autonomous driving', and 'Renewable energy integration' were generated as the detailed technology items for the technology items of 'Electric vehicle and transportation'.

In addition, the technology classification unit 203 may generate (or derive) technology titles, technology summaries, and major keywords for each of one or more detailed technology items using one or more clustered documents classified according to the content-based clustering.

Here, the technology classification unit 203 may generate one or more major keywords for each of one or more detailed technology items from the clustered documents based on at least some of the generative AI and a text mining algorithm.

In this case, the text mining algorithm may be configured based on some algorithms among TF-IDF (or c-TF-IDF), Word2Vec, and Doc2Vec.

In addition, the technology classification unit 203 may generate at least some of the technology titles and the technology summaries for each of the one or more detailed technology items based on one or more major documents and the major keywords identified for each of the one or more detailed technology items according to the content-based clustering.

In this case, the major document is a document determined depending on whether it includes the major keywords, and the more diverse the main keywords included in the document, it may be defined as the major document closer to a cluster center.

The technology classification unit 203 may determine the cluster center of each of the one or more detailed technology items based on the content-based clustering, and determine the predetermined number of clustered documents located at the cluster center as major documents of the corresponding detailed technology items.

To describe in more detail, the technology classification unit 203 may list the one or more clustered documents in order closer to the cluster center, and determine the predetermined number of clustered documents listed in order closer to the cluster center as the major documents.

Referring to FIG. 7, it can be confirmed that, by the technology classification unit 203, a technology summary of 'Battery technology is a field of technology to improve the type, performance, charging efficiency, and lifespan of batteries used in electric vehicles and means of transportation, and includes research and development for improving the capacity of the battery using various chemicals and materials and enabling longer driving mileage and faster charging' was generated (derived) for the detailed technology item of the 'Battery technology', and/or major keywords by including at least some of 'Battery chemical composition', 'Battery material development', 'Battery design and modeling', 'Battery lifespan extension', 'Battery recycling and environmental friendliness', 'Energy density and charging speed improvement', and 'New technology and research trend' were generated.

Here, the technology classification unit 203 may generate (or derive) technology titles, technology summaries, major keywords for at least some of the detailed technology items such as 'Electric vehicle power transmission system', 'Charging and infrastructure', 'Vehicle connectivity and autonomous driving' and 'Renewable energy integration', etc., as well as the detailed technology items of the 'Battery technology'.

In addition, the technology classification unit 203 may generate detailed technology items for at least some of a plurality of technology items such as a 'Chemical and electrolyte', 'Battery design and architecture', 'Charge and discharge management', 'Reliability and safety technology', 'New material and production', 'Energy storage and grid connection', and 'Mobile power and portable device', as well as the technology items of the 'Electric vehicle and transportation', and generate (or derive) technology titles, technology summaries, major keywords for at least some of the generated detailed technology items.

In addition, the technology classification unit 203 may derive at least one major player (e.g., a leading company or a competing company in the corresponding technology) in the corresponding detailed technical field for each of the detailed technology items.

Further, referring to FIGS. 8 and 9, the technology classification unit 203 may generate detailed technology items for technology items based on at least some of the categories of the documents.

To describe in more detail, the technology classification unit 203 may generate one or more detailed technology items for each of the categories of technical documents and web data based on the content-based clustering results and the generative AI model 221.

For example, the technology classification unit 203 may generate the detailed technology items for the technology item based on the technical document data, or may generate the detailed technology items for the technology item based on the web data.

To describe in more detail with reference to FIG. 8, it can be confirmed that, by the technology classification unit 203, one or more detailed technology items for each of the technology item of the 'Charge and discharge management' by dividing the technical document data and the web data thereof were generated, based on at least some of the clustering results and the document category classification results.

For example, it can be confirmed that, by the technology classification unit 203, detailed technology items of 'Charging infrastructure improvement', 'Automated charging system', 'Charging infrastructure connectivity', 'Battery capacity management', and 'Energy efficiency optimization' were generated, based on the technical document data for the technology item of the 'Charge and discharge management'.

In addition, it can be confirmed that, by the technology classification unit 203, detailed technology classifications were derived by generating detailed technology items such as 'Charge and discharge optimization', 'Wireless charging', 'Charging speed', 'Charge management', 'Analysis and prediction', and the like, based on the web data for the technology item of the 'Charge and discharge management'.

In addition, the technology classification unit 203 may derive at least some of technology titles, technology summaries, major keywords, and major players for at least some of the detailed technology items classified based on the technical document data or web data.

For example, referring to FIG. 8, it can be confirmed that, by the technology classification unit 203, major keywords such as a 'Charging station improvement', 'Charging infrastructure innovation', 'Multiple charging ports', 'Charging in city', and the like were derived for the detailed technology items of the 'Charging infrastructure improvement' classified based on the technical document data in the technology item of the 'Charge and discharge management', and major players such as 'ChargePoint', 'EVBox', 'EVgo', 'Blink Charging', 'Electrify America', and the like were derived.

In addition, it can be confirmed that, by the technology classification unit 203, major keywords such as a 'Charging and discharging efficiency', 'Charging and discharging algorithm', 'Software optimization', 'Fast charging', and the like were derived for the detailed technology items of the 'Charge and discharge optimization' classified based on the web data in the technology category of the 'Charge and discharge management', and major players such as 'Charge-Point', 'Voltaiq', 'ABB', 'EVgo', 'Blink Charging', and the like were derived.

Further, as shown in FIG. 8, the technology classification unit 203 may derive at least some of technology titles, technology summaries, major keywords, and major players for at least some of the classified detailed technology items such as an 'Automated charging system', 'Charging infrastructure connectivity', 'Battery capacity management', 'Energy efficiency optimization' based on the technical document data, and 'Wireless charging', 'Charging speed', 'Charge management', and 'Analysis and prediction' based on the web data.

In addition, the technology classification unit 203 may provide the number of documents classified by document category for each of the classified detailed technology items.

Referring to FIG. FIG. 9, it can be confirmed that, when outputting detailed technology classification information based on the technical documents, by the technology classification unit 203, for example, 12, 15, 21, 13 and 12 cases of patent documents corresponding to the detailed technology items of the 'Charging infrastructure improvement', 'Automated charging system', 'Charging infrastructure connectivity', 'Battery capacity management' and 'Energy efficiency optimization', respectively, were classified, among a total of 73 patent documents classified as technology items of the 'Charge and discharge management' for the patent document category.

In addition, the technology classification unit 203 may provide a list of the patent documents classified for each of the detailed technology items, provide one or more documents included in the list, or output a link connected to the document.

The technology classification unit 203 may provide document information, lists, and documents (or links connected to the documents) by the detailed technology item for various document categories such as standard documents, papers, examination regulations, reports, design documents, manuals, and educational data, as well as the patent documents.

As described above, the technology classification unit 203 may generate one or more detailed technology items for one or more technology items based on the generative AI model 221. In addition, the technology classification unit 203 may derive at least some of technology titles, technology summaries, major keywords, and major players for at least some of the detailed technology items based on at least some of the generative AI model 221 and the text mining algorithm.

In addition, if it is confirmed that there are non-clustered documents after performing clustering on the documents, the technology classification unit 203 may assign the detailed technology items to the non-clustered documents based on the last performed clustering results. In this case, if the detailed technology item corresponding to the non-clustered documents is not confirmed, the technology classification unit 203 may perform content-based clustering again on the documents including the non-clustered documents.

Thereafter, referring to FIG. 10, the trend analysis unit 205 may perform (305) trend analysis based on the collection results and classification results performed based on information collection (301) and technology classification (303). In this case, the trend analysis unit 205 may perform trend analysis based on the generative AI model 221 or the deep learning AI model 223.

Further, the trend analysis unit 205 may perform identification of major research subjects and manpower based on the collection results and the classification results.

To describe in more detail, the trend analysis unit 205 may perform trend analysis on the technologies for at least some of the technology analysis keywords, technology items, and detailed technology items based on various pieces of information obtained on the basis of the information collection (301) and technology classification (303) such as the technology items generated based on metaframe items, the search keywords and search formulas generated for the technology items, the documents obtained based on at least some of the search keywords and search formulas, the clustering results for the documents, at least one detailed technology item classified for the technology items, the technology titles, technology summaries, major keywords and major players derived for the detailed technology items, etc.

For example, referring to FIG. 10, it can be confirmed that, by the trend analysis unit 205, trend analyses of 'Proportion analysis by detailed technology classification (A)', 'Time series trend analysis (B)', 'Application frequency analysis by country/region (C)', and 'Technology lifecycle curve-based future growth prediction (D)' were performed.

To describe in more detail, with regard to the proportion analysis by detailed technology classification (A), the trend analysis unit 205 may analyze the proportion of the respective technologies in the trend of the entire technical field for the detailed technology items. Based on this, the trend analysis unit 205 may determine the growth probability or competitiveness of the corresponding detailed technology item technology.

In addition, with regard to the time series trend analysis (B), the trend analysis unit 205 may analyze trends over time for the technology items or detailed technology items. Based on this, the trend analysis unit 205 may determine the speed or pattern of technical development, and predict the of technical development. For example, the trend analysis unit 205 may predict future technology trend by analyzing changes in the number of applications and development speed of specific technology items or specific detailed technology items.

Further, with regard to the application frequency analysis by country/region (C), the trend analysis unit 205 may analyze the application frequency of technologies related to the technology items or detailed technology items in a specific country or region. Based on this, the trend analysis unit 205 may determine the technical leadership, competitiveness, major players, etc. for the corresponding technology items or detailed technology items for the specific country or region.

In addition, with regard to the technology lifecycle curve-based future growth prediction (D), the trend analysis unit 205 may predict future growth by analyzing data related to the life cycle of a specific technology. Based on this, the trend analysis unit 205 may predict the growth trend of a specific technology, whether competing technologies have emerged, the possibility of technology substitution and the like.

Thereafter, referring to FIGS. 10 and 11, the technology candidate group discovery unit 207 may discover (307) promising technology candidate groups using the trend analysis results. In this case, the technology candidate group discovery unit 207 may discover the promising technology candidate groups based on the generative AI model 221 or the deep learning AI model 223.

For example, referring to FIG. 10, it can be confirmed that, by the technology candidate group discovery unit 207, based on the trend analysis results, items of 'Ripple/recentness/frequency-based prospectivity evaluation and candidate group discovery (E)', 'Selection of representative patents/papers and major players by candidate group (F)', 'Competition-based external environment analysis (G)', and 'Internal and external capabilities-viewpoint promising technology evaluation map (H)' were derived.

To describe in more detail, with regard to the ripple/recentness/frequency-based prospectivity evaluation and candidate group discovery (E), the technology candidate group discovery unit 207 may evaluate the ripple and recentness in a specific technical field by using at least some of the proportion analysis by detailed technology classification (A) results and the application frequency analysis by country/region (C) results.

In this case, the technology candidate group discovery unit 207 may identify the application frequency and growth trend of specific technology items or specific detailed technology items through the time series trend analysis (B) results, and estimate promising technical fields based on the frequency. Based on this, the technology candidate group discovery unit 207 may discover candidate groups in the promising technical fields.

In addition, with regard to the selection of representative patents/papers and major players by candidate group (F), the technology candidate group discovery unit 207 may evaluate the reliability of the technology and existing technical level by analyzing the representative technical documents (e.g., patents, papers, etc.) within the discovered candidate group. The technology candidate group discovery unit 207 may identify companies, research institutes, and individuals, which are major players, to evaluate their leadership and competitiveness in the technical field.

Further, with regard to the competition-based external environment analysis (G), the technology candidate group discovery unit 207 may evaluate the competitive trend and competitiveness in the technical field by analyzing competing companies' technologies (e.g., patents, papers, products) and the like. The technology candidate group discovery unit 207 may identify competing companies' preferred fields and application trend through at least some of the proportion analysis by detailed technology classification (A) results and the application frequency analysis by country/region (C) results.

In addition, with regard to the internal and external capabilities-viewpoint promising technology evaluation map (H), the technology candidate group discovery unit 207 may synthesize internal capabilities and external environment analysis, and derive a promising technology evaluation map based on the analysis results of the promising technical fields and competing companies identified in the proportion analysis by detailed technology classification (A) and the application frequency analysis by country/region (C). Based on this, the technology candidate group discovery unit 207 may visualize promising technical fields and the positions of competing companies in internal capabilities and the external environment.

Further, the technology candidate group discovery unit 207 may output trend analysis and promising technology candidate group discovery results. In this case, the technology candidate group discovery unit 207 may output the trend analysis and promising technology candidate group discovery results based on the generative AI model 221 or the deep learning AI model 223.

For example, as shown in FIG. 11, the technology candidate group discovery unit 207 may output the trend analysis and promising technology candidate group discovery results including at least some of the topics among 'Technology growth analysis (1)', 'Core patent classification and summary information (2)', 'Technology-held major player information (3)', and 'Internal capability and external environment analysis (4)'.

To describe in more detail, the technology candidate group discovery unit 207 may perform the technology growth analysis (1) and generate results thereof based on the time series trend analysis (B) results and the technology lifecycle curve-based future growth prediction (D) results.

In addition, the technology candidate group discovery unit 207 may derive the core patent classification and summary information (2) and generate results thereof based on the proportion analysis by detailed technology classification (A) results and application frequency analysis by country/region (C) results.

In addition, the technology candidate group discovery unit 207 may derive the technology-held major player information (3) and generate results thereof based on the ripple/recentness/frequency-based prospectivity evaluation and candidate group discovery (E) results and the selection of representative patents/papers and major players by candidate group (F) results.

In addition, the technology candidate group discovery unit 207 may perform the internal capability and external environment analysis (4) and generate results thereof based on the competition-based external environment analysis (G) results and the internal and external capabilities-viewpoint promising technology evaluation map (H).

In addition, the technology candidate group discovery unit 207 may generate a customized report (or customized technology analysis report) based on the trend analysis and promising technology candidate group discovery results. In this case, the technology candidate group discovery unit 207 may generate the customized report on the basis of the trend analysis and promising technology candidate group discovery results based on the generative AI model 221 or the deep learning AI model 223.

For example, referring to FIG. 11, it can be confirmed that, by the technology candidate group discovery unit 207, a technology sensing and operational intelligence (O/I)

candidate group discovery report or a R&D task discovery/ promotion report was generated based on the technology growth analysis (1) results, the core patent classification and summary information (2), the technology-held major player information (3), and the internal capability and external environment analysis (4) results.

In addition, it can be confirmed that, by the technology candidate group discovery unit 207, a new business promotion strategy establishment and M&A candidate group discovery report was generated based on the technology growth analysis (1) results and the technology-held major player information (3).

In addition, it can be confirmed that, by the technology candidate group discovery unit 207, an intellectual property (IP) planning/strategy establishment report was generated based on the technology growth analysis (1) results and the core patent classification and summary information (2).

According to various embodiments, it is possible to reduce the time required for technology analysis while expanding the scope of technology analysis in a variety of fields through the method and device for analyzing technology.

According to various embodiments, costs and time required for basic technology analysis based on raw data may be saved through the method and device for analyzing technology, thereby it is possible to improve work efficiency by allowing data experts to focus on analysis of advanced information.

According to various embodiments, by providing the method and device for analyzing technology based on the generative AI model, it is possible to discover analysis indicators and method which reflect multifaceted aspects of technology.

According to the detailed description above, the functions of various embodiments described as being performed by the device 100 are operations processed through the processing unit 110 of the device 100, and may be performed by organically being connected to the device 100 and/or components of the device connected to the device 100.

In the present disclosure, any function performed by the device 100 has been described through various embodiments, but if a component that performs the corresponding function is not described as a component of the device 100, it should be understood that the device 100 includes a commonly known component that performs the function and/or is connected thereto.

As described above, although the embodiments have been described with limited drawings, it will be apparent to those skilled in the art that various modifications and alternations may be applied thereto based on the various embodiments.

For example, adequate effects may be achieved even if the foregoing processes and methods are carried out in different order than those described above, and/or the above-described elements, such as systems, structures, devices, or circuits, are combined or coupled in different forms and modes than those described above, or substituted or switched with other components or equivalents.

In particular, when describing with reference to the flowchart, it has been described that a plurality of steps are configured and the steps are sequentially executed in a predetermined order, but it is not necessarily limited to the predetermined order.

In other words, executing by changing or deleting at least some of the steps described in the flowchart or adding at least one step is applicable as an embodiment, and executing one or more steps in parallel may also be applicable as an embodiment. That is, it is not limited to that the steps are necessarily operated in a time-series order, and should be included in various embodiments of the present disclosure.

Therefore, other implements, embodiments, and other equivalents to claims are within the scope of claims to be describe below.

What is claimed is:

1. A method for analyzing technology comprising:

generating a metaframe structure for one or more keywords to be analyzed in a technical field, wherein the metaframe structure comprises a plurality of metaframe items, each metaframe item of the plurality of metaframe items comprises words or phrases from a table of contents, a topic, a title, or a heading of reports published in the technical field of the one or more keywords;

deriving a technology structure based on the metaframe structure using a generative AI model, wherein the deriving the technology structure comprises:

generating a plurality of technology items for the technology structure related to the one or more keywords to be analyzed in the technical field using the generative AI model, wherein each technology item of the plurality of technology items comprises words or phrases related to each metaframe item of the plurality of metaframe items for the one or more keywords in the technical field; and deriving the technology structure by connecting a subset of the plurality of generated technology items with a subset of the plurality of metaframe items included in the metaframe structure corresponding to the subset of the plurality of generated technology items;

generating search keywords for each of the plurality of generated technology items based on the derived technology structure;

generating one or more search formulas for each of the plurality of generated technology items using one or more search keywords;

searching and obtaining a plurality of documents based on the search keywords and the one or more search formulas;

refining the plurality of documents according to a similarity between the documents;

performing preprocessing to utilize contents of the plurality of refined documents;

performing content-based clustering on one or more refined documents of the plurality of refined documents for each of the plurality of technology items included in the technology structure based on at least one deep learning AI model to provide content-based clustering results;

performing technology classification to provide classification results of the plurality of refined documents based on results obtained by performing content-based clustering.

2. The method for analyzing technology according to claim 1, wherein the generating the metaframe structure comprises:

designing the metaframe structure by including a plurality of metaframe items derived based on a report published from at least one company or at least one organization registered in a technical field corresponding to the keywords to be analyzed.

3. The method for analyzing technology of claim 1, wherein the plurality of metaframe structures comprise at least one metaframe item of sub-technology, technical element, process element, application industry, social impact, and related technology.

4. The method for analyzing technology according to claim 1, wherein the generating search keywords comprises:
  generating one or more search keywords corresponding to each of the plurality of generated technology items included in the technology structure using the generative AI model.

5. The method for analyzing technology according to claim 4, wherein the searching and obtaining the plurality of documents comprises:
  searching and obtaining documents including a text related to the keywords to be analyzed from a predetermined database or web based on at least some of the search keywords and search formulas.

6. The method for analyzing technology according to claim 5, further comprising:
  performing the content-based clustering on each of one or more documents previously obtained for each of the plurality of technology items by dividing categories between technical documents including patents or papers, and web data;
  classifying one or more detailed technology items for each of the categories of the technical document and web data based on the content-based clustering results and the generative AI model; and
  generating major keywords for each of the one or more detailed technology items using one or more clustered documents classified according to the content-based clustering.

7. The method for analyzing technology according to claim 1, wherein at least one of the refining and the preprocessing is performed based on the at least one deep learning AI model and one or more documents of each of the plurality of generated technology items included in the technology structure.

8. The method for analyzing technology according to claim 7, further comprising:
  classifying one or more detailed technology items for each of the plurality of generated technology items based on the content-based clustering results and the generative AI model; and
  generating technology titles, technology summaries, and major keywords for each of the one or more detailed technology items using one or more clustered documents classified according to the content-based clustering.

9. The method for analyzing technology according to claim 8, further comprising:
  generating one or more major keywords for each of the one or more detailed technology items from the clustered documents based on at least one of the generative AI model and a text mining algorithm.

10. The method for analyzing technology according to claim 9, wherein at least some of the technology titles and the technology summaries for each of the one or more detailed technology items are generated based on the major keywords and one or more major documents identified for each of the one or more detailed technology items according to the content-based clustering.

11. The method for analyzing technology according to claim 10, further comprising:
  determining a cluster center of each of the one or more detailed technology items based on the content-based clustering; and determining the predetermined number of clustered documents located at the cluster center as the one or more major documents of the corresponding detailed technology items.

12. The method for analyzing technology according to claim 1, further comprising:
  performing trend analysis based on the acquisition and collection results and the classification results performed in the information collection step and the technology classification step; and
  discovering promising technology candidate groups using the trend analysis results.

13. The method for analyzing technology of claim 1, wherein the performing the trend analysis further comprises:
  performing identification of major research subjects and manpower based on the plurality of refined documents and the classification results.

14. A device for analyzing technology comprising:
  a storage unit in which a generative AI model is stored;
  at least one processor in communication with the storage unit, wherein the at least one processor is to:
    generate a metaframe structure for one or more keywords to be analyzed in a technical field, wherein the metaframe structure comprises a plurality of metaframe items, each metaframe item of the plurality of metaframe items comprises words or phrases from a table of contents, a topic, a title, or a heading of reports published in the technical field of the one or more keywords;
    derive a technology structure based on the metaframe structure using the generative AI model, wherein, when deriving the technology structure, the at least one processor is to:
      generate a plurality of technology items for the technology structure related to the one or more keywords to be analyzed in the technical field using the generative AI model, wherein each technology item of the plurality of technology items comprises words or phrases related to each metaframe item of the plurality of metaframe items for the one or more keywords in the technical field; and
      derive the technology structure by connecting a subset of the plurality of generated technology items with a subset of the plurality of metaframe items included in the metaframe structure corresponding to the subset of the plurality of generated technology items;
    generate search keywords for each of the plurality of generated technology items based on the derived technology structure;
    generate one or more search formulas for each of the plurality of generated technology items using one or more search keywords;
    search and obtain a plurality of documents based on the search keywords and the one or more search formulas;
    refine the plurality of documents according to a similarity between the documents;
    perform preprocessing to utilize contents of the plurality of refined documents;
    perform content-based clustering on one or more refined documents of the plurality of refined documents for each of the plurality of technology items included in the technology structure based on at least one deep learning AI model to provide content-based clustering results;

perform technology classification to provide classification results of the plurality of refined documents based on results obtained by performing content-based clustering.

15. The device for analyzing technology according to claim 14, wherein the at least one processor is further configured to: design the metaframe structure by including a plurality of metaframe items derived based on a report published from at least one company or at least one organization registered in a technical field corresponding to the keywords to be analyzed.

16. The device for analyzing technology according to claim 14, wherein the at least one processor is further configured to: perform the refinement, the preprocessing, and the content-based clustering on one or more documents for each of the plurality of technology items included in the technology structure based on the at least one deep learning AI model.

17. The device for analyzing technology according to claim 14, wherein the at least one processor is further configured to:

perform trend analysis based on the acquisition and collection results and the classification results performed by the processor; and discover promising technology candidate groups using the trend analysis results.

* * * * *